United States Patent
Caron

(10) Patent No.: US 6,917,529 B2
(45) Date of Patent: Jul. 12, 2005

(54) UNREGULATED DC-DC CONVERTER HAVING SYNCHRONOUS RECTIFICATION WITH EFFICIENT GATE DRIVES

(75) Inventor: Donald Richard Caron, Windham, NH (US)

(73) Assignee: Power-One Limited, Grand Cayman (KY)

( * ) Notice: Subject to any disclaimer, the term of this patent is extended or adjusted under 35 U.S.C. 154(b) by 0 days.

(21) Appl. No.: 10/726,893

(22) Filed: Dec. 2, 2003

(65) Prior Publication Data

US 2005/0117372 A1 Jun. 2, 2005

(51) Int. Cl.[7] ................................................ H02H 7/122
(52) U.S. Cl. .................................................... 363/56.12
(58) Field of Search .......................... 363/56.02, 56.12, 363/89, 132, 17; 361/91.7

(56) References Cited

U.S. PATENT DOCUMENTS 6,304,461 B1 * 10/2001 Walker ......................... 363/17

* cited by examiner

Primary Examiner—Shawn Riley
(74) Attorney, Agent, or Firm—O'Melveny & Myers LLP

(57) ABSTRACT

An unregulated DC-to-DC power converter suitable for intermediate bus voltage converter applications includes synchronous rectifiers that are driven efficiently to provide faster transition time and reduced loss. The DC-to-DC power converter comprises a transformer having a primary winding and at least first and second secondary windings. An input circuit is coupled to the primary winding and is adapted to apply an alternating polarity square wave voltage to the primary winding. An output circuit comprising an output filter is coupled to a tap of the first secondary winding. The output filter provides a DC output voltage. A first synchronous rectifier is coupled to a first end of the first secondary winding and a second synchronous rectifier is coupled to a second end of the first secondary winding. The second secondary winding has a first end coupled to a control terminal of the first synchronous rectifier and a second end coupled to a control terminal of the second synchronous rectifier. A first snubber circuit is coupled between the control terminal of the first synchronous rectifier and the second end of the first secondary winding. A second snubber circuit is coupled between the control terminal of the second synchronous rectifier and the first end of the first secondary winding. The first and second snubber circuits provide faster transition of the first and second synchronous rectifiers, respectively, between on and off states.

17 Claims, 4 Drawing Sheets

TIME (ns)

TIME (ns)

UNREGULATED DC-DC CONVERTER HAVING SYNCHRONOUS RECTIFICATION WITH EFFICIENT GATE DRIVES

BACKGROUND OF THE INVENTION

1. Field of the Invention

The present invention relates to power converter circuits, and more particularly, to an unregulated DC-to-DC power converter suitable for intermediate bus applications in which synchronous rectifiers are efficiently driven to provide faster transition time and reduced loss.

2. Description of Related Art

With the increasing complexity of electronic systems, it is common for an electronic system to require power provided at several different discrete voltage and current levels. For example, electronic systems may include discrete circuits that require voltages such as 3 v, 5 v, 9 v, etc. Further, many of these circuits require a relatively low voltage (e.g., 1 v), but with relatively high current (e.g., 100 A). Since it is undesirable to deliver relatively high current at low voltages over a relatively long distance through an electronic device, it is known to distribute an intermediate bus voltage throughout the electronic system, and include an individual point-of-load ("POL") regulator, i.e., DC/DC converter, at the point of power consumption within the electronic system. Particularly, a POL regulator would be included with each respective electronic circuit to convert the intermediate bus voltage to the level required by the electronic circuit. An electronic system may include multiple POL regulators to convert the intermediate bus voltage into each of the multiple voltage levels. Ideally, the POL regulator would be physically located adjacent to the corresponding electronic circuit so as to minimize the length of the low voltage, high current lines through the electronic system. The intermediate bus voltage can be delivered to the multiple POL regulators using low current lines that minimize loss.

Typically, a separate power converter would provide an isolated intermediate bus voltage (e.g., 9 volts) from a relatively higher nominal input voltage source (e.g., 48 volts). As long as the input voltage source is regulated, the intermediate bus voltage converter can be unregulated. A conventional intermediate bus voltage converter includes a transformer to provide isolation between the input and output voltages. On the output side of the transformer, synchronous rectifiers convert the periodic voltage on the transformer to a DC output voltage. In view of their low on state resistance, the synchronous rectifiers are typically provided by field effect transistors (FETs). Since the periodic voltage on the transformer comprises a 100% duty cycle without intermediate zero voltage states, the synchronous rectifiers can be triggered by voltage transitions across the transformer. But, a drawback of the conventional intermediate bus voltage converter is that the synchronous rectifiers are slow to transition between on and off states, causing them to sink current to ground before settling in the off state. This results in a reduction of efficiency of the intermediate bus voltage converter, which is exacerbated when the converter is operating at a low or no load condition.

Thus, it would be advantageous to have an unregulated DC-to-DC power converter suitable for intermediate bus voltage converter applications in which the synchronous rectifiers are driven efficiently to provide faster transition time and reduced loss.

SUMMARY OF THE INVENTION

The present invention provides an unregulated DC-to-DC power converter suitable for intermediate bus voltage converter applications in which the synchronous rectifiers are driven efficiently to provide faster transition time and reduced loss.

In an embodiment of the invention, a DC-to-DC power converter comprises a transformer having a primary winding and at least first and second secondary windings. An input circuit is coupled to the primary winding and is adapted to apply an alternating polarity square wave voltage to the primary winding. An output circuit comprising an output filter is coupled to a tap of the first secondary winding. The output filter provides a DC output voltage. A first synchronous rectifier is coupled to a first end of the first secondary winding and a second synchronous rectifier is coupled to a second end of the first secondary winding. The second secondary winding has a first end coupled to a control terminal of the first synchronous rectifier and a second end coupled to a control terminal of the second synchronous rectifier. A first snubber circuit is coupled between the control terminal of the first synchronous rectifier and the second end of the first secondary winding. A second snubber circuit is coupled between the control terminal of the second synchronous rectifier and the first end of the first secondary winding. The first and second snubber circuits provide faster transition of the first and second synchronous rectifiers, respectively, between on and off states.

More particularly, the first and second snubber circuits further comprise respective first and second capacitors. The first and second synchronous rectifiers comprise respective first and second MOSFET devices. The control terminals of the first and second synchronous rectifiers further comprise gate terminals of the first and second MOSFET devices. The first end of the first secondary winding is coupled to a drain terminal of the first MOSFET device and the second end of the first secondary winding is coupled to a drain terminal of the second MOSFET device. The first and second capacitors have capacitances selected to correspond to a size of the first and second MOSFET devices.

In another embodiment of the invention, a method of improving low-load efficiency of the DC-to-DC power converter comprises absorbing charge across the first and second synchronous rectifiers during respective off states of the first and second synchronous rectifiers, and injecting charge into the control terminals of the first and second synchronous rectifiers during respective on states of the first and second synchronous rectifiers. The absorbing step further comprises charging first and second capacitors coupled to respective ones of the first and second synchronous rectifiers. The injecting step further comprises discharging the first and second capacitors into respective control terminals of the second and first synchronous rectifiers. A more complete understanding of the unregulated DC-to-DC power converter suitable for intermediate bus voltage converter applications in which the synchronous rectifiers are driven efficiently to provide faster transition time and reduced loss will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention provides an unregulated DC-to-DC power converter suitable for intermediate bus voltage converter applications in which the synchronous rectifiers are driven efficiently to provide faster transition time and reduced loss. In the detailed description that follows, like element numerals are used to describe like elements illustrated in one or more figures.

Figure 1:
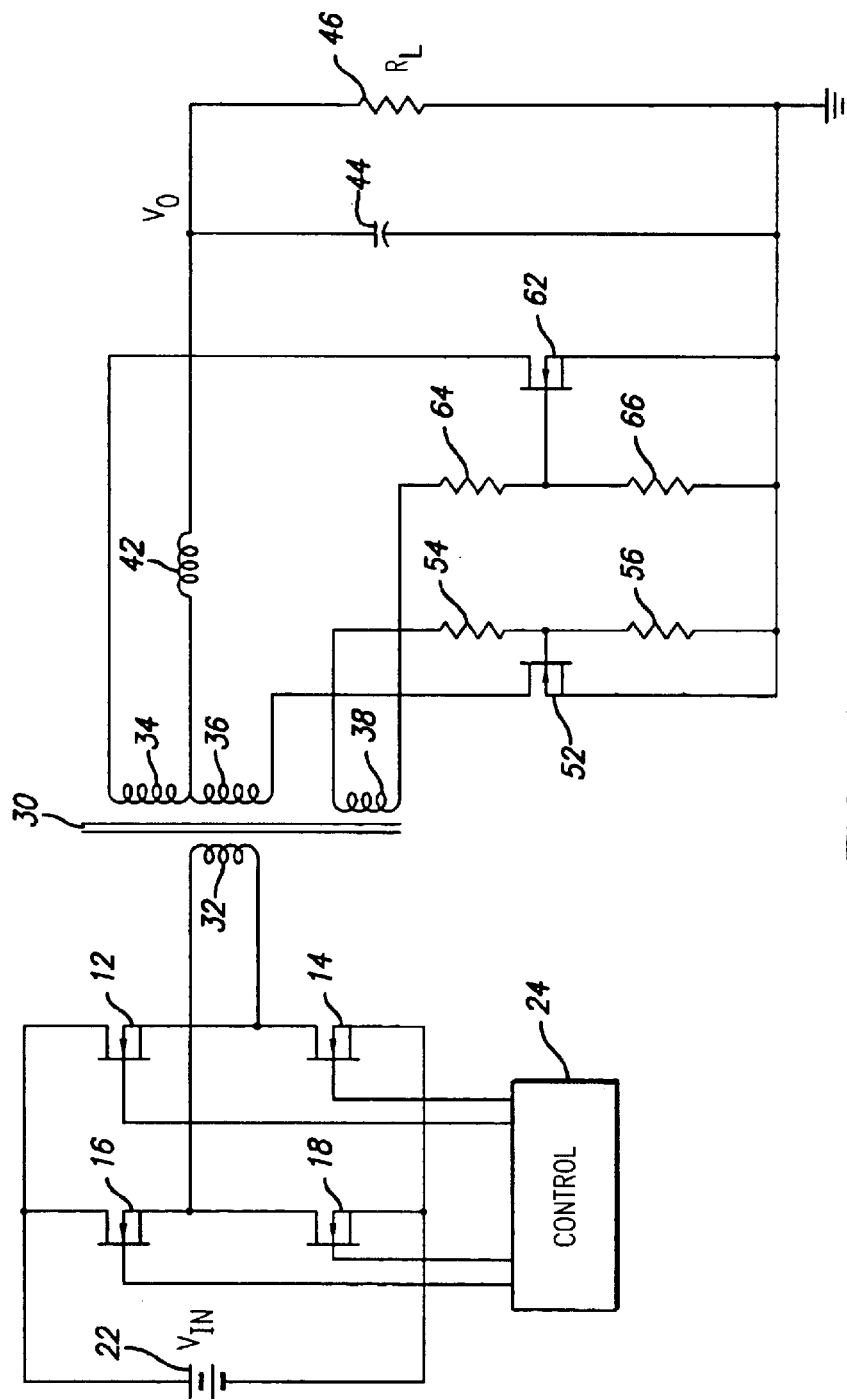
FIG. 1 is a block diagram of a prior art DC-to-DC power converter.

Referring first to FIG. 1, a prior art DC-to-DC power converter is shown. The power converter of FIG. 1 provides a DC output voltage ($V_O$) that is isolated from the input voltage ($V_{IN}$), and includes a transformer 30 having a primary winding 32 and a plurality of secondary windings 34, 38. On the primary side of the transformer is a conventional full bridge topology, two pairs of primary power switches 12, 14 and 16, 18 provide alternating current to the primary winding 32. In particular, the first pair of power switches 12, 14 are arranged in series with the input voltage ($V_{IN}$), with a junction between the source terminal of the switch 12 and the drain terminal of switch 14 coupled to one end of the primary winding 32. Likewise, the second pair of power switches 16, 18 are arranged in series with the input voltage ($V_{IN}$), with a junction between the source terminal of the switch 16 and the drain terminal of switch 18 coupled to another end of the primary winding 32. A suitable control circuit 24 determines the timing of drive signals to the gate terminals of the power switches 12, 14, 16, 18. Specifically, the control circuit 24 drives diagonally opposite power switches (i.e., switches 12 and 18, or 14 and 16) so that they are turned on simultaneously during alternate half cycles. This causes the primary winding 32 of the transformer 30 to be driven with an alternating polarity square wave of amplitude $\pm V_{IN}$, thereby producing corresponding full-wave square waveshapes on secondary windings 34, 38. It should be appreciated that a conventional half bridge topology or push-pull topology could also be advantageously utilized in the power converter, as generally known in the art.

On the secondary side of the transformer 30, secondary winding 34 has a center tap that is coupled to an output filter that includes inductor 42 and capacitor 44. A DC output voltage ($V_O$) is produced across the capacitor 44, which is delivered to a load denoted as load resistor 46 ($R_L$). The ends of secondary winding 34 are coupled to ground through respective synchronous rectifiers 52, 62. The gate terminals of the synchronous rectifiers 52, 62 are driven by secondary winding 38. Particularly, a first end of secondary winding 38 is coupled to the gate terminal of synchronous rectifier 52 through a voltage divider comprising resistors 54, 56, and a second end of secondary winding 38 is coupled to the gate terminal of synchronous rectifier 62 through a voltage divider comprising resistors 64, 66.

When the voltage across the secondary windings 34, 38 is positive, synchronous rectifier 52 is turned on and synchronous rectifier 62 is turned off, forming a current path through the lower portion of secondary winding 34 and into the output filter. Conversely, when the voltage across the secondary windings 34, 38 is negative, synchronous rectifier 52 is turned off and synchronous rectifier 62 is turned on, forming a current path through the upper portion of secondary winding 34 and into the output filter. The output filter provides the DC output voltage ($V_O$) smoothes out the square wave ripple on the center tap of the secondary winding 34. Since the voltage transition on each of the secondary windings 34, 38 is identical, the activations of the synchronous rectifiers 52, 62 can by synchronized to the waveform on the transformer 30.

Figure 2:
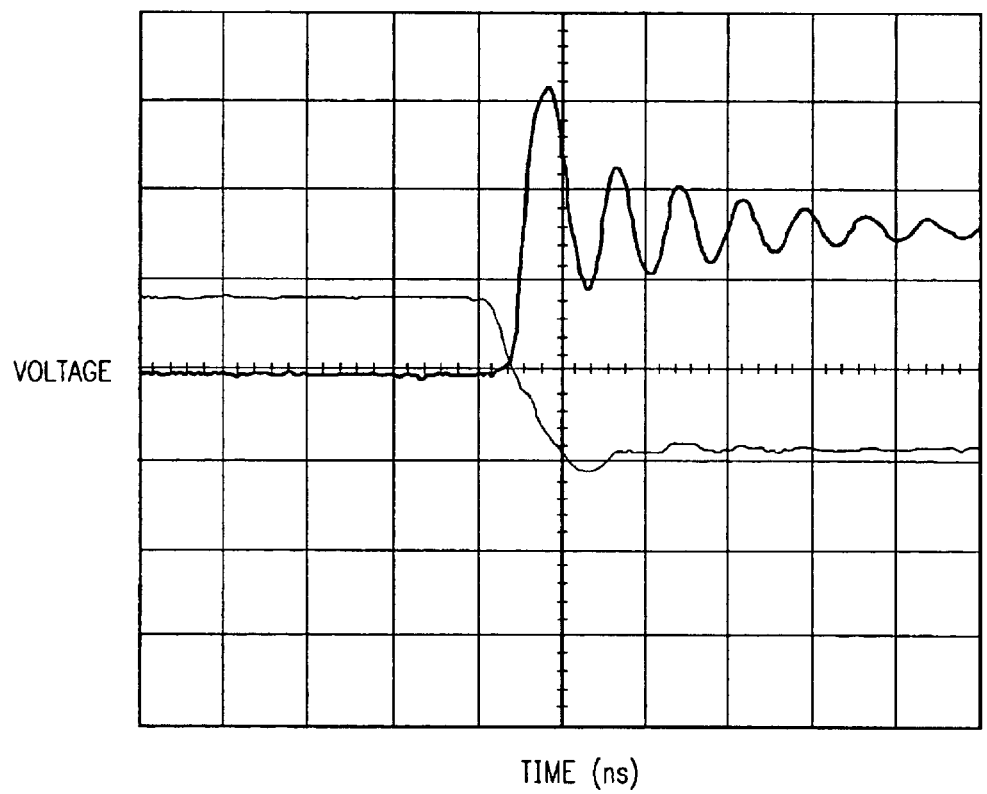
FIG. 2 is a graph reflecting the drain voltage and gate drive of a synchronous rectifier of the prior art DC-to-DC power converter.

FIG. 2 illustrates graphically the drain voltage and gate drive voltage of one of the synchronous rectifiers 52, 62 of the prior art DC-to-DC power converter of FIG. 1. Along the horizontal axis, the scale represents 10 ns per unit, and along the vertical axis, the scale represents 1 volt per unit. Ideally, the gate drive signal will transition quickly from high to low, which quickly turns off the synchronous rectifier and cuts off the flow of current through the synchronous rectifier to ground. But, in practice, the transition is not so rapid. As shown in FIG. 2, the gate drive transitions from high to low in approximately 70 ns. The drain voltage rises to a peak voltage of 32 volts, and then exhibits oscillatory ringing at a frequency of approximately 2.5 MHz. The ringing is caused by energy stored in the transformer resonating between the transformer inductance and the synchronous rectifier capacitance. In the no-load condition, the power converter draws 11 W of power.

Figure 3:
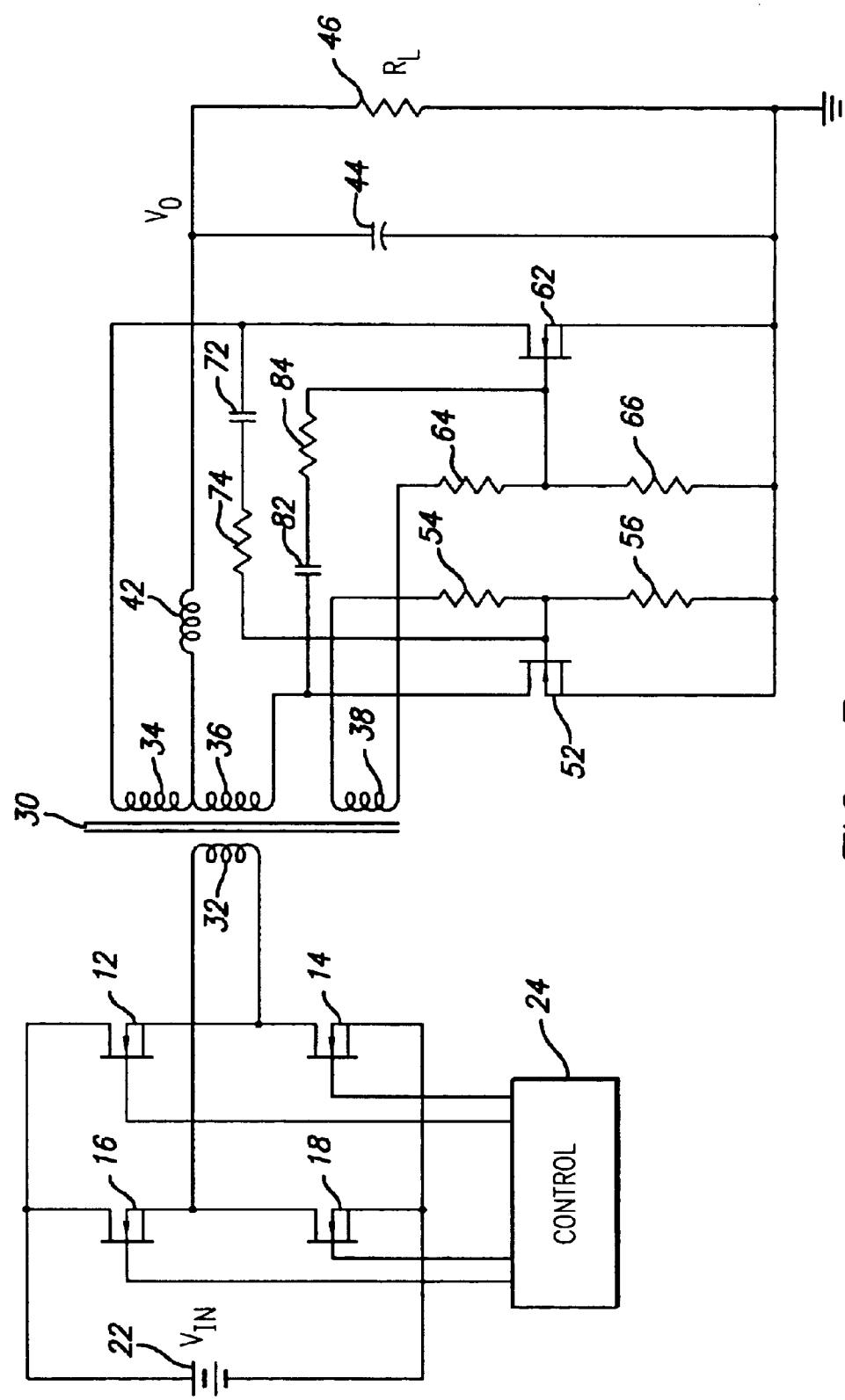
FIG. 3 is a block diagram of a DC-to-DC power converter in accordance with an embodiment of the present invention.

Referring now to FIG. 3, a DC-to-DC power converter is shown in accordance with an embodiment of the invention. The present DC-to-DC power converter is similar in most respects to the prior art power converter, except that current snubber circuits are coupled to the gate terminals of the synchronous rectifiers 52, 62. Particularly, a first snubber circuit comprising capacitor 72 and resistor 74 coupled in series is connected between the gate terminal of the synchronous rectifier 52 and the drain terminal of the synchronous rectifier 62. A second snubber circuit comprising capacitor 82 and resistor 84 coupled in series is connected between the gate terminal of the synchronous rectifier 62 and the drain terminal of the synchronous rectifier 52. The size of the capacitance selected for capacitors 72 and 82 will depend on the size of the MOSFET devices used to provide the synchronous rectifiers 52, 62. As known in the art, MOSFET devices typically have distinctive gate charge characteristics that relate to their size. Bigger MOSFET devices typically require higher gate charge to drive the devices to conduction, and hence a larger capacitor would be used in the snubber circuit. The inverse would also be true for smaller MOSFET devices.

Figure 4:
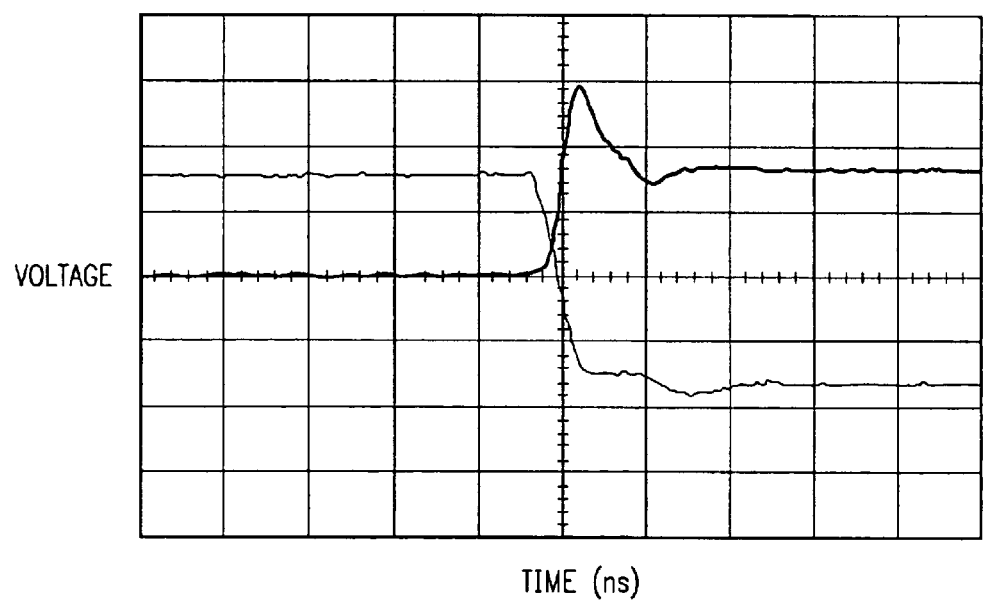
FIG. 4 is a graph reflecting the drain voltage and gate drive of a synchronous rectifier of the present DC-to-DC power converter of FIG. 3.

The operation of the snubber circuits within the power converter of FIG. 3 is now described in conjunction with FIG. 4, which shows in graphical form the drain voltage and gate drive voltage of one of the synchronous rectifiers 52, 62 (using the same scale as FIG. 2). When the transformer changes state, synchronous rectifier 52 is turned on and synchronous rectifier 62 is turned off. The drain voltage of synchronous rectifier 52 rises rapidly, as shown in FIG. 4, and this voltage charges the capacitor 82 of the second snubber circuit that is coupled to the drain terminal of synchronous rectifier 52. In turn, the voltage across the capacitor 82 helps to turn on the synchronous rectifier 62 by providing a second current path to the gate terminal of the synchronous rectifier 62 in addition to the current path from the secondary winding 38. The voltage ripple that was present on the drain voltage of the prior art power converter is no longer present on the drain voltage of the present power converter (compare FIGS. 2 and 4). This is because the excess energy at the drain terminal flows into the capacitor 82 goes and into the gate terminal of the synchronous rectifier 62, causing the voltage on the gate terminal to rise more quickly and thereby turn on the synchronous rectifier more quickly. Conversely, when the drain voltage of the synchronous rectifier 52 falls, reflecting another change of state of the transformer, the capacitor 82 discharges and causes the gate drive voltage to fall and thereby turn off the synchronous rectifier 62 more quickly. It should be appreciated that the operation of the other snubber circuit is the same.

Figure 5:
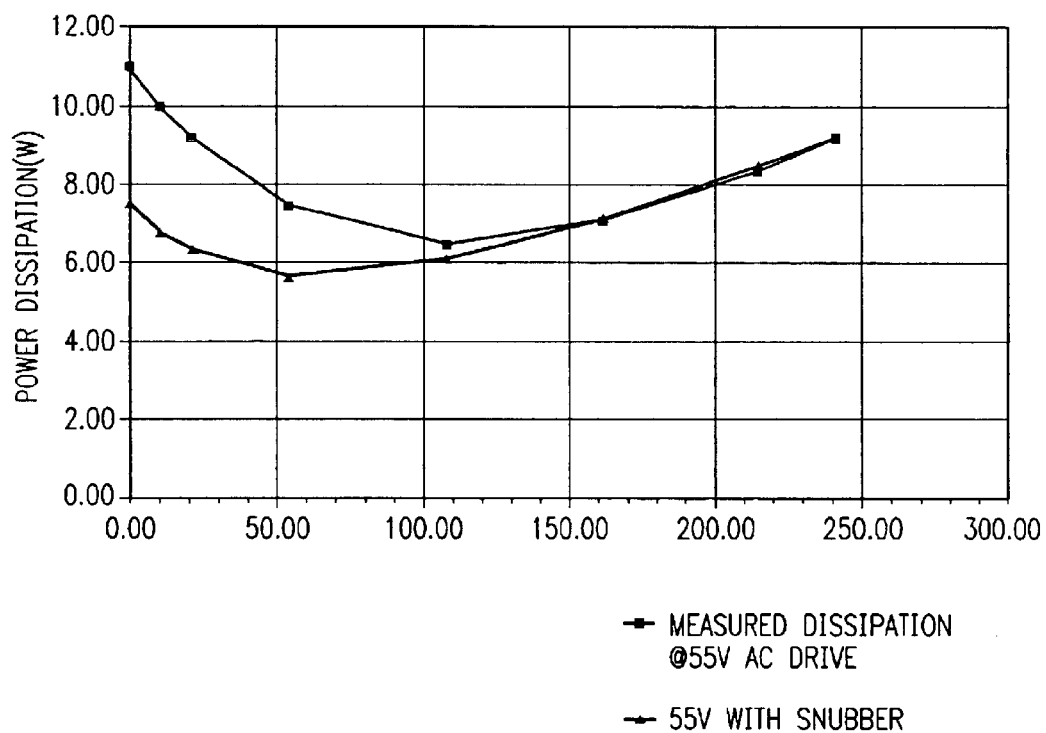
FIG. 5 is a graph comparing efficiency of the present DC-to-DC power converter to the prior art DC-to-DC power converter.

As shown in FIG. 4, the gate drive transitions from high to low in approximately 20 ns. The drain voltage rises to a peak voltage of 29 volts, and the oscillatory ringing is no longer present. In the no-load condition, the power converter draws 7.5 W of power, which represents a loss reduction of over 30% from the prior art power converter. FIG. 5 illustrates a graph comparing the efficiency of the present DC-to-DC power converter to the prior art DC-to-DC power converter. More particularly, the graph shows the power dissipation (W) along the vertical axis measured against output power (W) along the horizontal axis, with the curve containing square symbols reflecting performance of the prior art power converter and the curve containing triangular symbols reflecting performance of the present power converter having the snubber circuits. As shown in FIG. 5, at low output power levels, there is a substantial difference in power dissipation, i.e., power loss, between the devices. This reflects that the snubber circuits were advantageous in reducing power dissipation of the power converter. At higher power levels, the curves converge, reflecting that the snubber circuits do not otherwise effect performance of the power converter.

Having thus described a preferred embodiment of an unregulated DC-to-DC power converter suitable for intermediate bus voltage converter applications in which the synchronous rectifiers are driven efficiently to provide faster transition time and reduced loss, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A DC-to-DC power converter comprising:
   a transformer having a primary winding and at least first and second secondary windings;
   an input circuit coupled to said primary winding and adapted to apply an alternating polarity square wave voltage to said primary winding;
   an output circuit comprising an output filter coupled to a tap of said first secondary winding, said output filter providing a DC output voltage, a first synchronous rectifier coupled to a first end of said first secondary winding and a second synchronous rectifier coupled to a second end of said first secondary winding, said second secondary winding having a first end coupled to a control terminal of said first synchronous rectifier and a second end coupled to a control terminal of said second synchronous rectifier;
   a first snubber circuit coupled between said control terminal of said first synchronous rectifier and said second end of said first secondary winding; and
   a second snubber circuit coupled between said control terminal of said second synchronous rectifier and said first end of said first secondary winding;
   wherein, said first and second snubber circuits provide faster transition of said first and second synchronous rectifiers, respectively, between on and off states.

2. The power converter of claim 1, wherein said first and second snubber circuits further comprise respective first and second capacitors.

3. The power converter of claim 1, wherein first and second synchronous rectifiers comprise respective first and second MOSFET devices.

4. The power converter of claim 3, wherein said control terminals of said first and second synchronous rectifiers further comprise gate terminals of said first and second MOSFET devices.

5. The power converter of claim 3, wherein said first end of said first secondary winding is coupled to a drain terminal of said first MOSFET device and said second end of said first secondary winding is coupled to a drain terminal of said second MOSFET device.

6. The power converter of claim 3, wherein said first and second snubber circuits comprise respective first and second capacitors having capacitances corresponding to a size of said first and second MOSFET devices.

7. The power converter of claim 1, wherein said input circuit further comprises a full bridge topology.

8. In a DC-to-DC power converter comprising a transformer having a primary winding and at least first and second secondary windings, an input circuit coupled to said primary winding and adapted to apply an alternating polarity square wave voltage to said primary winding, and an output circuit comprising an output filter coupled to a tap of said first secondary winding, said output filter providing a DC output voltage, a first synchronous rectifier coupled to a first end of said first secondary winding and a second synchronous rectifier coupled to a second end of said first secondary winding, said second secondary winding having a first end coupled to a control terminal of said first synchronous rectifier and a second end coupled to a control terminal of said second synchronous rectifier, an improvement comprises:
   a first snubber circuit coupled between said control terminal of said first synchronous rectifier and said second end of said first secondary winding; and
   a second snubber circuit coupled between said control terminal of said second synchronous rectifier and said first end of said first secondary winding;
   wherein, said first and second snubber circuits provide faster transition of said first and second synchronous rectifiers, respectively, between on and off states.

9. The power converter of claim 8, wherein said first and second snubber circuits further comprise respective first and second capacitors.

10. The power converter of claim 8, wherein first and second synchronous rectifiers comprise respective first and second MOSFET devices.

11. The power converter of claim 10, wherein said control terminals of said first and second synchronous rectifiers further comprise gate terminals of said first and second MOSFET devices.

12. The power converter of claim 10, wherein said first end of said first secondary winding is coupled to a drain terminal of said first MOSFET device and said second end of said first secondary winding is coupled to a drain terminal of said second MOSFET device.

13. The power converter of claim 10, wherein said first and second snubber circuits comprise respective first and second capacitors having capacitances corresponding to a size of said first and second MOSFET devices.

14. The power converter of claim 8, wherein said input circuit further comprises a full bridge topology.

15. A method of improving low-load efficiency of an isolated DC-to-DC power converter comprising a transformer having a primary winding and at least first and second secondary windings on which an alternating polarity square wave voltage is applied, and an output circuit comprising an output filter coupled to a tap of said first secondary winding, said output filter providing a DC output voltage, a first synchronous rectifier coupled to a first end of said first secondary winding and a second synchronous rectifier coupled to a second end of said first secondary winding, said second secondary winding having a first end coupled to a control terminal of said first synchronous rectifier and a second end coupled to a control terminal of said second synchronous rectifier, the method comprises:

absorbing charge across said first and second synchronous rectifiers during respective off states of said first and second synchronous rectifiers; and injecting charge into said control terminals of said first and second synchronous rectifiers during respective on states of said first and second synchronous rectifiers.

16. The method of claim 15, wherein said absorbing step further comprises charging first and second capacitors coupled to respective ones of said first and second synchronous rectifiers.

17. The method of claim 16, wherein said injecting step further comprises discharging said first and second capacitors into respective control terminals of said second and first synchronous rectifiers.

* * * * *